US010897649B1

(12) United States Patent
Germano et al.

(10) Patent No.: US 10,897,649 B1
(45) Date of Patent: Jan. 19, 2021

(54) MATURE THEMES PREDICTION FOR ONLINE CONTENT

(71) Applicant: Amazon Technologies, Inc., Seattle, WA (US)

(72) Inventors: Vernon Germano, Bainbridge Island, WA (US); Kripa Kanchana Sivakumar, Seattle, WA (US); Xiang Hao, Kenmore, WA (US); Emily Evon McAninly, North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 16/142,584

(22) Filed: Sep. 26, 2018

(51) Int. Cl.
*H04N 21/25* (2011.01)
*H04N 21/466* (2011.01)
*H04N 21/475* (2011.01)
*G06F 16/71* (2019.01)

(52) U.S. Cl.
CPC ......... *H04N 21/4668* (2013.01); *G06F 16/71* (2019.01); *H04N 21/251* (2013.01); *H04N 21/4756* (2013.01)

(58) Field of Classification Search
CPC ........... H04N 21/4668; H04N 21/4756; G06F 16/71; G06N 20/00
See application file for complete search history.

(56) References Cited

U.S. PATENT DOCUMENTS

| 8,706,655 | B1* | 4/2014 | Rangarajan | G06Q 30/0282 706/12 |
| 9,674,579 | B1* | 6/2017 | Jaini | H04N 21/6582 |
| 10,242,080 | B1 | 3/2019 | Cohen et al. | |
| 10,643,074 | B1 | 5/2020 | McAninly et al. | |
| 2007/0168853 | A1 | 7/2007 | Jarman | |
| 2008/0120345 | A1 | 5/2008 | Duncombe | |
| 2008/0250328 | A1 | 10/2008 | Konttinen | |
| 2009/0234831 | A1 | 9/2009 | Ebadollahi et al. | |
| 2012/0030554 | A1 | 2/2012 | Toya | |
| 2012/0276732 | A1 | 11/2012 | Lin et al. | |
| 2015/0142753 | A1 | 5/2015 | Soon-Shiong | |
| 2016/0381320 | A1 | 12/2016 | Mate et al. | |
| 2017/0032820 | A1 | 2/2017 | Davis, III et al. | |
| 2017/0113143 | A1 | 4/2017 | Marr et al. | |
| 2017/0289589 | A1* | 10/2017 | Koumchatzky | H04N 21/251 |
| 2017/0289624 | A1* | 10/2017 | Avila | H04L 65/604 |
| 2017/0332113 | A1 | 11/2017 | Haritaoglu et al. | |
| 2018/0098125 | A1* | 4/2018 | Bender | H04N 21/25891 |
| 2018/0276565 | A1* | 9/2018 | Brandao | G06N 20/00 |
| 2019/0027162 | A1 | 1/2019 | Fukayama et al. | |
| 2019/0036986 | A1 | 1/2019 | Sathyanarayana et al. | |
| 2019/0258902 | A1* | 8/2019 | Colligan | G06K 9/6262 |

OTHER PUBLICATIONS

U.S. Appl. No. 16/003,748, filed Jun. 8, 2018, Mamdouh Mohamed Hamdy Abdu et al.
U.S. Appl. No. 16/003,791, filed Jun. 8, 2018, McAninly et al.
(Continued)

*Primary Examiner* — Junior O Mendoza
(74) *Attorney, Agent, or Firm* — Weaver Austin Villeneuve & Sampson LLP

(57) ABSTRACT

Methods and apparatus are described that relate to the use of machine learning techniques to accurately predict ratings for various types of content across multiple mature themes.

18 Claims, 3 Drawing Sheets

(56) References Cited

OTHER PUBLICATIONS

U.S. Appl. No. 16/142,487, filed Sep. 26, 2018, Germano et al.
U.S. Office Action dated Nov. 29, 2019 issued in U.S. Appl. No. 16/003,791.
U.S. Notice of Allowance dated Feb. 27, 2020 issued in U.S. Appl. No. 16/003,791.
Bing Hu, Bin Liu, Neil Zhenqiang Gong, Deguang Kong, and Hongxia Jin. 2015. Protecting Your Children from Inappropriate Content in Mobile Apps: an Automatic Maturity Rating Framework. In Proceedings of the 24th ACM International on Conference on Information and Knowledge Management (CIKM '15) (Year: 2015).
P. Y. Lee, S. C. Hui and A. C. M. Fong, "Neural networks for web content filtering," in IEEE Intelligent Systems, vol. 17, No. 5, pp. 48-57, Sep.-Oct. 2002 (Year: 2002).
Acar E, Irrgang M, Maniry D, Hopfgartner F. Detecting violent content in hollywood movies and user-generated videos. InSmart Information Systems 2015 (pp. 291-314). Springer, Cham. (Year: 2015).
Celik, E. A. (Apr. 2017). Affective Analysis of Videos: Detecting Emotional Content in Real-Life Scenarios.Doctoral Thesis, Technische Universitat Berlin, http://dx.doi.org/10.14279/depositonce-5824 (Year: 2017).
U.S. Office Action dated Dec. 17, 2018 issued in U.S. Appl. No. 16/003,748.
U.S. Final Office Action dated Jun. 27, 2019 issued in U.S. Appl. No. 16/003,748.
U.S. Office Action dated Oct. 9, 2019 issued in U.S. Appl. No. 16/003,748.
U.S. Final Office Action dated May 20, 2020 issued in U.S. Appl. No. 16/003,748.

\* cited by examiner

MATURE THEMES PREDICTION FOR ONLINE CONTENT

BACKGROUND

Media content rating systems provide classification standards for various kinds of content based on depictions of violence, sexuality, substance abuse, profanity, etc. A particular classification or rating is typically assigned for an entire video title (e.g., movie or television show). Using the Motion Picture Association of America (MPAA) film rating system as an example, a "G" or "General Audiences" rating indicates that the content of a movie is suitable for all ages, while an "R" or "Restricted" rating indicates that children under 17 should not view the content without a parent. Such ratings have historically been assigned through a manual process of evaluation involving a committee of people. However, as the volume of content grows and the rate at which content is published increases, such approaches to rating are becoming increasingly impracticable. In addition, it is often unclear why a particular conventional rating has been applied.

DETAILED DESCRIPTION

This disclosure describes the use of machine learning techniques for predicting the appropriateness of content for specific audiences relative to each of a number of different mature themes. Such mature themes might represent, for example, violence, sexuality, or profanity. Using these techniques, a particular item of content, e.g., a video title, is rated or scored for each of these themes based on a corresponding machine learning model that is trained specifically to identify content for that theme. As will be appreciated, such a capability may be important from a compliance perspective and potentially as warning labels for viewers. An example will be instructive.

Figure 1:
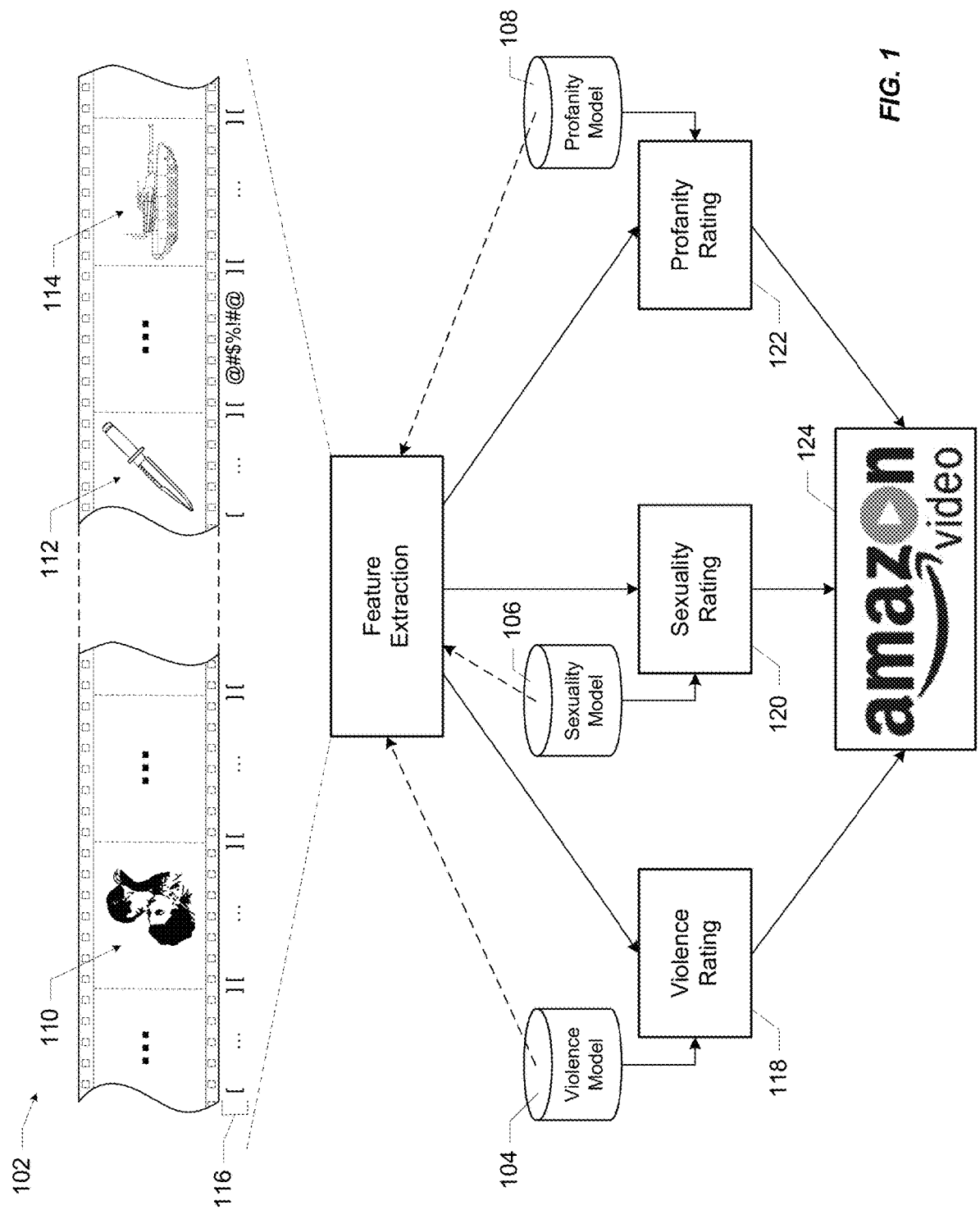
FIG. 1 is an illustration of a particular implementation enabled by the present disclosure.

FIG. 1 illustrates an example of an implementation in which unrated video content 102 is processed using three different machine learning models 104, 106, and 108 that correspond to different mature themes; in this example, violence, sexuality, and profanity, respectively. Each model is trained on content that has been previously rated or scored. The previous ratings or scores for the training data might be assigned, for example, by human operators as part of the process of training of the models.

One or more feature sets are extracted from video content 102. The features might include or be based on, for example, visual elements (e.g., elements 110, 112, and 114) derived from the frames of video content 102 using computer vision techniques. Extracted features might also include text or linguistic features derived from the caption information 116 associated with video content 102. It will be understood that these two types of information are merely examples, and that a wide variety of other types of information might also be used to generate features for a content item. In addition, generation of the feature set for each theme may be informed by the underlying machine learning model.

The feature set(s) are then processed (by blocks 118, 120, and 122) using each of the theme models to generate a rating or a score for each theme. Each rating or score represents an aggregation of the recognized features for the respective theme over the content. For example, each rating or score for a given theme could represent an intensity of the recognized features corresponding to that theme, e.g., as represented by the duration of scenes including features that correspond to the theme, the percentage of frames including features corresponding to the theme, the specific nature of the recognized features, etc.

The ratings or scores might be used in a variety of ways. According to one such use case, the ratings or scores might be used to filter content recommendations that are presented in a carousel in the user interface of a content service 124 such as, for example, Prime Video from Amazon. For example, if the viewer is known to be a child, the carousel of recommendations for that viewer might be filtered not to include any video titles that have a score for any of the mature themes that is greater than 1 (on a scale of 1 to 5). According to another use case, the ratings or scores can be used to provide more detailed information to the viewer about why a particular content item has a particular overall rating. For example, while a video title is rated as including "mild sexuality," it might also be rated as including "graphic violence" and "graphic profanity," therefore earning an "R" rating on the MPAA scale. As is evident from these use cases, the ratings or scores enabled by the present disclosure represent more precise tools for ensuring that the level of appropriateness of content is properly identified.

Figure 2:
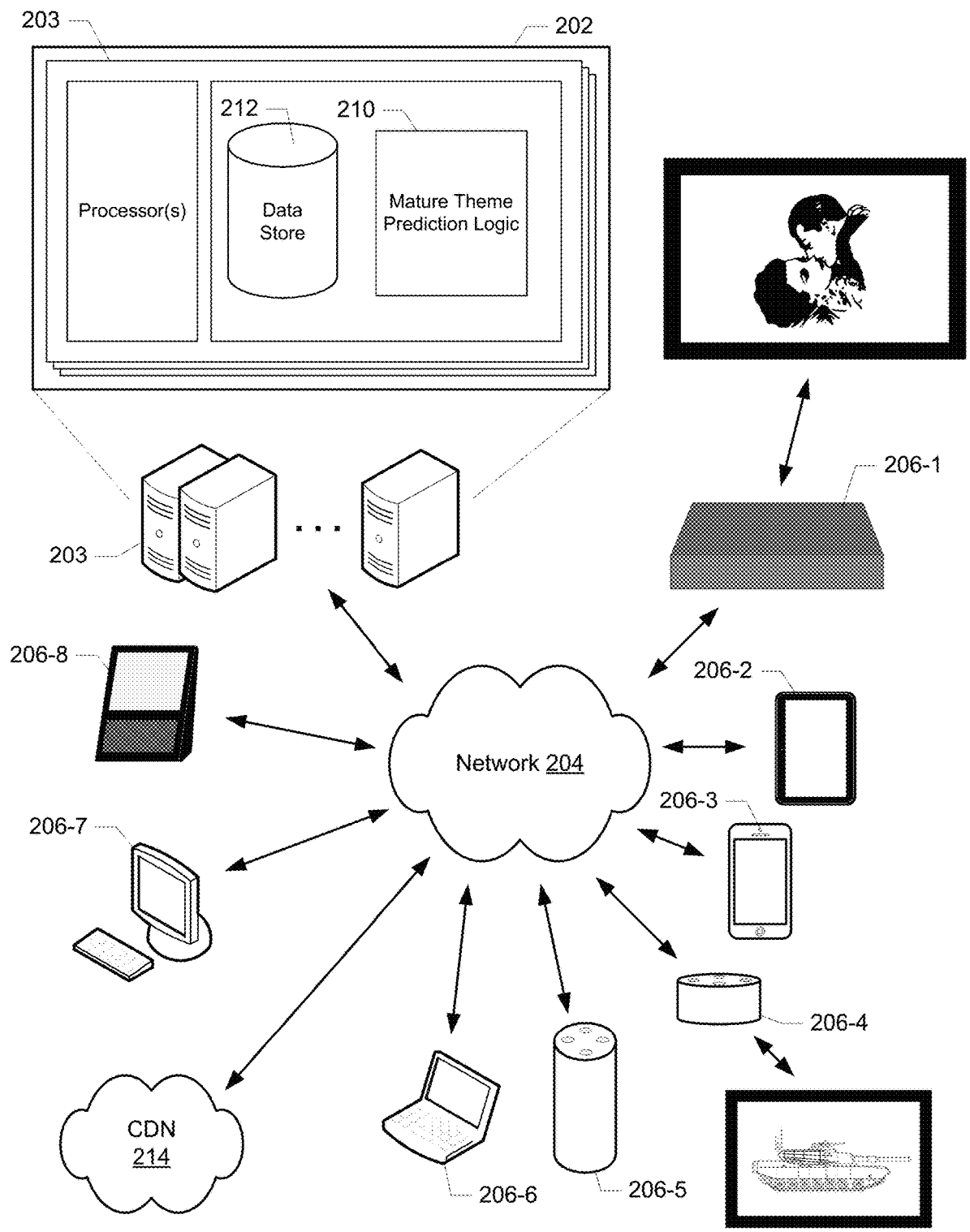
FIG. 2 is a simplified diagram of a computing environment in which various implementations enabled by the present disclosure may be practiced.

FIG. 2 illustrates an example of a computing environment in which streaming and on-demand content (including both video and audio) may be provided via network 204 to a variety of client devices (206-1 through 206-8) in accordance with the techniques described herein. Service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to mature theme prediction logic 210, service 202 may include other types of logic (not shown) involved in the delivery of content as part of a video-on-demand service or a streaming video service.

In addition to rating or scoring content across multiple mature themes, and providing access to video content, service 202 may also include a variety of information related to the video content (e.g., associated metadata and manifests in data store 212 which service 202 uses, or to which service 202 provides access). Data store 212 may also include user demographic profiles. Data store 212 may also include content features sets, data representing machine learning models, and recommender logic as described herein. Alternatively, at least some of this information may be provided and/or hosted by one or more separate platforms, e.g., CDN 214, or some other third-party platform. It should be noted that, while logic 210 and data store 212 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
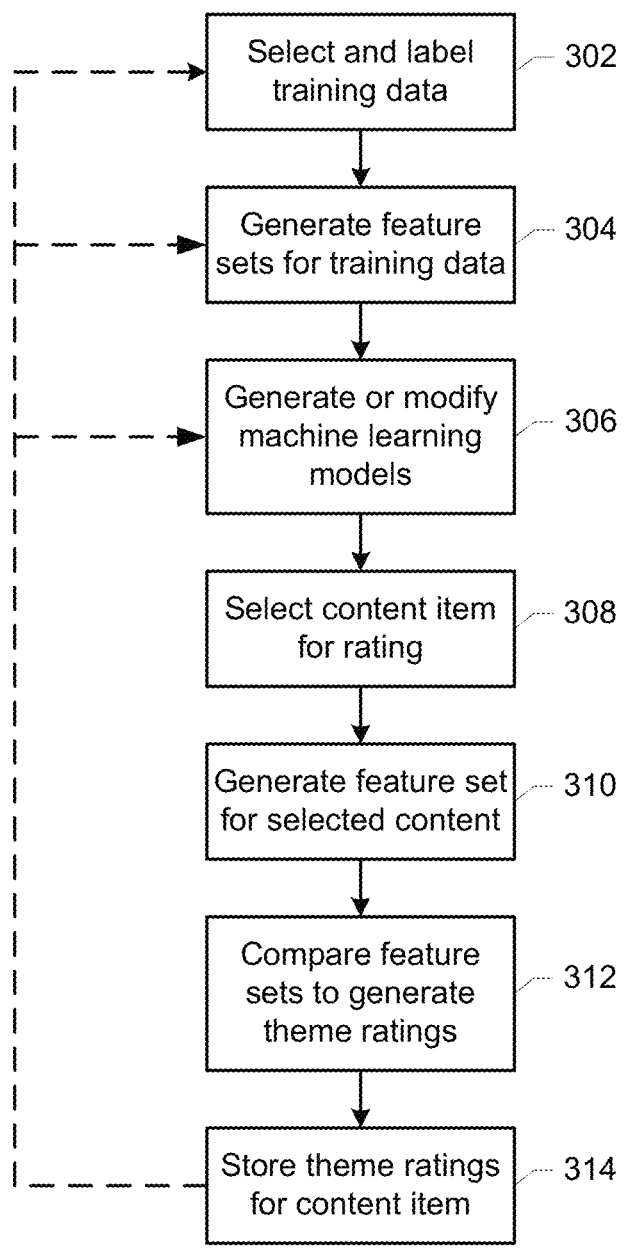
FIG. 3 is a flowchart illustrating operation of a class of implementations enabled by the present disclosure.

FIG. 3 is a flowchart illustrating various implementations in which machine learning techniques are employed for predicting ratings of content across multiple mature themes including, for example, violence, sexuality, profanity, drug use, etc. It should be noted that, while these themes appear in examples described herein, many other themes are contemplated to be within the scope of this disclosure. For example, some content may include political, social, or religious overtones or imagery that might be objectionable to some viewers. As such, implementations are contemplated in which machine learning models are developed that can recognize such elements and rate the content accordingly. More generally, implementations enabled by the present disclosure may be configured to recognize and rate content relative to any theme for which there is potential for viewers to have particular sensitivities.

Content items are selected for use as training data and each content item is labeled with ratings for multiple mature themes (302). The content items might be, for example, video titles from the library of an online video service. And although examples described herein refer to video titles and video content in general, it should be understood that the techniques enabled by the present disclosure may be applied to a variety of content types including, for example, audio content, literary and textual content, images, etc.

The ratings, which may represent an intensity level for the corresponding theme, may take a variety of forms. For example, the ratings might be represented as discrete categories or levels within the particular theme. If the theme is violence, the ratings might include or represent "no violence," "mild violence," "moderate violence," and "graphic violence." Alternatively, the ratings might be integers on a numerical scale (e.g., 1-5), with the high end of the scale representing the highest intensity for that theme. As another alternative, the ratings could be numerical scores over some range (e.g., 0 to 100%). Many variations on these approaches are contemplated.

The ratings for the training data may also be derived in a variety of ways. For example, some content has associated metadata that includes information about the basis for the overall rating assigned to that content (e.g., the MPAA rating for a video title). This information might indicate that an "R" rating was assigned because of "graphic violence" and "excessive profanity." These descriptions can be used as training labels or mapped to corresponding training labels. Alternatively, the content in the training data set could be reviewed and manually labeled by human operators for each theme.

A feature set is generated for each of the content items in the training set (304). The types of features represented in the feature set, the manner in which the features are extracted or derived, and the way in which the feature set is constructed may vary considerably depending on the mature theme, the corresponding mature theme machine learning model, the implementation, the type of content, the machine learning techniques employed, and/or any of a variety of other factors.

According to various implementations relating to video content or content including visual content, at least some of the features in the features set are generated using computer vision techniques that identify visual elements in the visual portion of the content, e.g., the video frames of video content. Any of a wide variety of feature extraction and detection models and tools may be employed. For example, an object detection neural network such as the AlexNet convolutional neural network or any model supported by the Caffe deep learning framework might be used. Other suitable tools, models, and frameworks known to those of skill in the art may also be suitable for particular implementations.

In addition, the nature of the visual elements that may be recognized for this purpose may vary considerably depending on the implementation. For example, the visual elements might be specific objects or object types (e.g., explosions, weapons, humans, etc.). In another example, the visual elements might be specific actors or characters. In another example, the visual elements might be more abstract such as the production style, overall look and feel, or visual features that are characteristic of particular types of content. For example, the level of motion from frame to frame might be indicative of an action film, or the design aesthetic of a video title might include bright, primary colors indicative of children's content, or the range of colors and image resolution might be indicative of animated content. Anything that computer vision techniques are capable of identifying from the visual components of a content item may be the basis for a feature in the feature set.

The way in which a recognized visual element may be represented in a feature set may also vary considerably. For example, each recognition of a weapon or nudity in a video title might contribute to a violence count feature or a sexuality count feature for that title, with different types of elements within each feature category possibly contributing differently to its count, and with different ranges of the count corresponding to different levels of that feature (e.g., none, mild, moderate, excessive, etc.). Recognition of a particular animated character popular with toddlers might set a children's content feature to a "1" rather than "0," or could be represented as a score in the range from 0 to 1 that is based on the number of recognitions or the overall time on the screen. The proportion of scenes in a movie title with a high degree of motion could be represented as a score that is representative of the likelihood the title is an action film. Again, those of skill in the art will understand the broad range of possibilities from the diversity of these examples.

It should be noted that implementations are also contemplated in which visual elements that are the basis of features in the feature set may be recognized using mechanisms other than computer vision techniques. For example, motion vectors that are generated as part of the video encoding process may be used to identify and/or quantify motion in a video title. More generally, any visual elements that have representative signatures or characteristics associated with the encoding and decoding of video data may also be leveraged in this manner.

According to some implementations, caption information associated with video content may be used to derive features for the feature set. For example, any of a variety of conventional or proprietary natural language processing and text mining techniques may be used to process caption information to identify keywords, concepts, topics, sentiment, language, profanity, conversational tone, etc. (including the frequency of any of these), as well as correlations of any of these with mature themes, e.g., violence, sexuality, etc. As with the features representing visual elements, the features for caption information may represented in a wide variety of ways.

Metadata associated with content items may also be a source of information to generate features for the feature set. Such information might include, for example, the genre of the content (e.g., suspense, action, or romantic comedy for video content, or hip-hop, jazz, or alternative-rock for music content), people associated with the content (e.g., actors, directors, artists, musicians, etc.), association ratings (e.g., MPAA ratings), etc. Again, features based on such information may be represented in a variety of ways.

Other possible sources of information for feature generation may include data representing user behavior. For example, patterns in the way in which users interact with or consume content might be the basis of features. This might include when content is consumed, e.g., time of day, day of the week, seasonal variations, etc. In one example, certain content items might be viewed largely during the time of day considered to be "family viewing hours," e.g., 6 pm-8 pm. Such information might, particularly when combined with other features, be indicative of content that is suitable for all audiences. Variations on these themes will be apparent to those of skill in the art.

The features within a feature set, and corresponding features across features sets may be included/excluded and/or weighted in various ways for the purpose of improving the confidence in the mature theme rating predictions made based on the corresponding models over time. For example, visual content features might be deemphasized relative to caption features for standup comedy because the visuals for most standup comedy content are fairly consistent and typically unobjectionable across titles, whereas the language of the comedian and the nature of the subject matter discussed is extremely important for getting the mature theme rating correct.

Initially, features may be included/excluded and weights may be applied as a result of decisions by human operators that are based on an initial understanding of the relative importance of the various features for certain types of content and/or particular mature themes. This understanding may be derived from a variety of sources including, for example, ratings organization rubrics, operator intuition, user feedback, survey research, or human evaluation of the content in the training data set. As will be appreciated by those of skill in the art, the feature sets and weights may evolve over time as the underlying machine learning models evolve along with the understanding of what features correlate more or less strongly with the accuracy of the ratings for each mature theme.

Referring back to FIG. 3, machine learning models are generated or modified for each of the mature themes using the feature sets and labels of the training data set (306). This may involve human supervision to guide and manipulate feature extraction and weighting so that the performance of each model in scoring the training content converges to the assigned training labels. Once the models can reliably rate the content items of the training data, they may be applied to new or unrated content.

A new or unrated content item is selected or identified (308), and one or more feature sets is/are generated for that content item (310). The feature set(s) may be constructed and weighted in a manner similar to those that are generated for the training data set, and so might be informed by or specific to the particular machine learning model, the type of content (e.g., as indicated in metadata), etc. There may be different feature sets for each of the mature themes and its corresponding machine learning model, or different subsets and/or weightings of a single feature set might be used for the different themes/models.

The feature set for the selected content item is compared with the feature sets for the content items in the training data set and processed using each of the different mature theme machine learning models to generate a rating or score for the content item for each mature theme (312). Generally speaking, machine learning involves the construction of a model (e.g., on which the feature sets are based), and the evaluation of that model with respect to a metric of interest (e.g., the prediction of content appeal to a particular demographic). Comparison of feature sets may be accomplished using any of a wide variety of techniques. For example, where the feature sets are represented by corresponding feature vectors, similarity to existing feature vectors (e.g., features sets representing appealing content) can be determined using techniques such as nearest neighbor classification and neural networks, or statistical approaches as exemplified by Bayesian techniques.

The set of mature theme ratings for the content item are then associated with that content item for use in connection with distribution of the content item (314). The ratings might be used in connection with recommending the content item to some segment of a user population subscribing to a content service. For example, if a viewer is known to be a child, a content carousel of recommendations for that child would not include any titles with any of the ratings higher than what is deemed appropriate for a child of that age. In another example, if a viewer's viewing history indicates that the viewer has previously watched several titles that include graphic violence, but has never viewed a title with a sexuality rating higher than 1 on a scale of 0 to 5, recommendations to that viewer could be filtered to include titles with violence, but none depicting sexuality. Expressed user preferences might also be used to filter recommended content using the ratings.

Alternatively or in addition, the ratings might be provided in the user interface of a content service in association with a representation of the content item. For example, when a user navigates to the details screen for a particular video title, the ratings for each of the mature themes can be included along with the content summary, actors, and video duration, so that the user can make an informed choice as to whether she would like to view that title. This might be a bar graph in which each bar represents a mature theme. Alternatively, it might be descriptive text indicating the rating for each theme.

Because the features extracted from a content item may have associated temporal information (e.g., video frame time stamps), some implementations may provide more detailed information regarding the portion(s) of the content in which a particular mature theme is represented. For example, visual objects or dialogue associated with violence might be recognized in a majority of frames of a scene that begins at two minutes into a video title and extends for three minutes. In addition to including those recognized features in generating the overall rating for violence for the title, the time range of the scene may also be captured for presentation to the user so that the user can know exactly where in the video the violent content occurs, and possibly its level of intensity. This might be presented as a numerical range relative to the video's duration, e.g., graphic violence at 00:02:00-00:05:00, or a more abstract visual representation, e.g., a horizontal bar for each mature theme in which the length of the bar represents the video's duration and individual segments of the bar (possibly coded to indicate intensity) represent durations in which the mature theme is depicted.

As indicated by the dashed line in FIG. 3, the accuracy of the mature theme ratings assigned to content using the various machine learning models can be evaluated and used to evolve the feature sets extracted from the content as well as the underlying models, thereby continually improving the accuracy of the predictions. As will be appreciated, this may be important from a compliance perspective. That is, content rating regimes for mature themes vary considerably around the world. This presents an ongoing challenge for content services that serve a global market. The techniques enabled by the present disclosure allow for the rating of content over many themes with high levels of precision and accuracy, and the ability to then transform or map those ratings to conform to the specific requirements of each regime. And this may be done in a scalable way, capturing and rating new content for each regime as it comes online.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
for each of a plurality of training video titles, labeling the training video title with a plurality of mature theme ratings, each mature theme rating corresponding to one of a plurality of mature themes and representing an intensity for the corresponding mature theme for the training video title, the mature themes including violence and sexuality;
generating a feature set for each training video title, each feature set including visual features derived from images of the corresponding training video title using computer vision techniques, each feature set also including caption features derived from caption data of the corresponding training video title;
generating a machine learning model for each of the mature themes using the feature sets for the training video titles and the mature theme ratings;
identifying an unrated video title;
generating a feature set for the unrated video title, the feature set for the unrated video title including visual features derived from images of the unrated video title using computer vision techniques, the feature set for the unrated video title also including caption features derived from caption data of the unrated video title;
generating a plurality of mature theme ratings for the unrated video title by comparing the feature set for the unrated video title with the feature sets for a subset of the training video titles and using the machine learning model for each of the mature themes, each mature theme rating for the unrated video title representing an intensity for a corresponding one of the mature themes for the unrated video title; and
recommending the unrated video title to a subset of a plurality of users based on the mature theme ratings associated with the unrated video title.

2. The method of claim 1, further comprising, for each of the training video titles, deriving the mature theme ratings with which the training video title is labeled from metadata associated with the training video title.

3. The method of claim 1, further comprising modifying one or more of the machine learning models based on accuracy of one or more of the mature theme ratings for the unrated video title.

4. The method of claim 1, wherein generating the mature theme ratings for the unrated video title includes weighting individual features of the feature set for the unrated video content depending on which of the mature theme models is being used.

5. A computer-implemented method, comprising:
selecting a plurality of machine learning models, each of the machine learning models corresponding to one of a plurality of mature themes, the plurality of mature themes including violence and sexuality, the machine learning models representing feature sets for a plurality of first content items, each feature set including visual features derived from images of the corresponding first content item and caption features derived from caption data of the corresponding first content item;
identifying a second content item;
generating a feature set for the second content item that includes visual features derived from images of the second content item and caption features derived from caption data of the second content item;
generating a plurality of ratings for the second content item by comparing the feature set for the second content item with the feature sets for the first content items and using the machine learning model for each of the mature themes, each of the ratings corresponding to one of the mature themes and representing an intensity for the corresponding mature theme, the ratings including a violence rating and a sexuality rating; and using each of the ratings explicitly in connection with distribution of the second content item.

6. The method of claim 5, further comprising, for each of the first content items, labeling the first content item with a plurality of ratings corresponding to the mature themes and derived from content metadata associated with the first content item.

7. The method of claim 5, wherein the visual features of each feature set are derived from images of the corresponding content item using computer vision techniques.

8. The method of claim 5, further comprising modifying one or more of the machine learning models based on accuracy of one or more of the ratings for the second content item.

9. The method of claim 5, wherein generating the ratings for the second content item includes weighting individual features of the feature set for the content item depending on which of the machine learning models is being used.

10. The method of claim 5, wherein using the ratings in connection with distribution of the second content item includes recommending the second content item to a subset of a plurality of users based on the ratings associated with the second content item.

11. The method of claim 5, wherein using the ratings in connection with distribution of the second content item includes providing the ratings for presentation in a user interface of a content service in association with a representation of the second content item.

12. A computer program product, comprising one or more non-transitory, computer-readable media having computer program instructions stored therein, the computer program instructions being configured such that, when executed by one or more computing devices, the computer program instructions cause the one or more computing devices to:
select a plurality of machine learning models, each of the machine learning models corresponding to one of a plurality of mature themes, the plurality of mature themes including violence and sexuality, the machine learning models representing feature sets for a plurality of first content items, each feature set including visual features derived from images of the corresponding first content item and caption features derived from caption data of the corresponding first content item;
identify a second content item;
generating a feature set for the second content item that includes visual features derived from images of the second content item and caption features derived from caption data of the second content item;
generate a plurality of ratings for the second content item by comparing the feature set for the second content item with the feature sets for the first content items and using the machine learning model for each of the mature themes, each of the ratings corresponding to one of the mature themes and representing an intensity for the corresponding mature theme, the ratings including a violence rating and a sexuality rating; and
use each of the ratings explicitly in connection with distribution of the second content item.

13. The computer program product of claim 12, wherein the computer program instructions are further configured to cause the one or more computing devices to, for each of the first content items, label the first content item with a plurality of ratings corresponding to the mature themes and derived from content metadata associated with the first content item.

14. The computer program product of claim 12, wherein the visual features of each feature set are derived from images of the corresponding content item using computer vision techniques.

15. The computer program product of claim 12, wherein the computer program instructions are further configured to cause the one or more computing devices to modify one or more of the machine learning models based on accuracy of one or more of the ratings for the second content item.

16. The computer program product of claim 12, wherein the computer program instructions are configured to cause the one or more computing devices to generate the ratings for the second content item by weighting individual features of the feature set for the content item depending on which of the machine learning models is being used.

17. The computer program product of claim 12, wherein the computer program instructions are configured to cause the one or more computing devices to use the ratings in connection with distribution of the second content item by recommending the second content item to a subset of a plurality of users based on the ratings associated with the second content item.

18. The computer program product of claim 12, wherein the computer program instructions are configured to cause the one or more computing devices to use the ratings in connection with distribution of the second content item by providing the ratings for presentation in a user interface of a content service in association with a representation of the second content item.

* * * * *